United States Patent [19]

Tuck et al.

[11] Patent Number: 5,800,609
[45] Date of Patent: Sep. 1, 1998

[54] PRODUCTION OF PIGMENTS

[75] Inventors: Brian Tuck, Kilmacolm; Kanwaljit Bal, Bishopbriggs, both of Scotland

[73] Assignee: Ciba Specialty Chemicals Corporation, Tarrytown, N.Y.

[21] Appl. No.: 676,713

[22] Filed: Jul. 8, 1996

[30] Foreign Application Priority Data

Jul. 12, 1995 [GB] United Kingdom ............ 9514244
Jan. 31, 1996 [GB] United Kingdom ............ 9601883

[51] Int. Cl.$^6$ .................................................. C09B 27/00
[52] U.S. Cl. ....................................... 106/496; 106/493
[58] Field of Search ................................. 106/496, 493

[56] References Cited

U.S. PATENT DOCUMENTS

| | | | |
|---|---|---|---|
| 2,261,626 | 11/1941 | Lang | 534/581 |
| 2,573,851 | 11/1951 | Lacey et al. | 106/496 |
| 3,120,508 | 2/1964 | Braun et al. | 534/581 |
| 3,555,003 | 1/1971 | Ribka et al. | 106/496 |
| 3,607,861 | 9/1971 | Braun et al. | 534/581 |
| 3,775,148 | 11/1973 | Bradley | 106/496 |
| 4,169,091 | 9/1979 | Kuhne et al. | 106/496 |
| 4,465,810 | 8/1984 | Toepker et al. | 525/285 |
| 4,515,639 | 5/1985 | Dopfer et al. | 106/496 |
| 4,643,770 | 2/1987 | Hays | 106/496 |
| 4,680,057 | 7/1987 | Hays | 106/496 |
| 4,927,466 | 5/1990 | Hays | 106/494 |
| 4,968,352 | 11/1990 | Keys et al. | 106/496 |
| 5,108,509 | 4/1992 | Booth et al. | 106/504 |
| 5,151,129 | 9/1992 | Morrison et al. | 106/496 |
| 5,246,494 | 9/1993 | Platman et al. | 106/496 |

FOREIGN PATENT DOCUMENTS

| | | |
|---|---|---|
| 0057880 | 8/1982 | European Pat. Off. . |
| 1226652 | 7/1960 | France . |
| 1265673 | 10/1961 | France . |
| 1449449 | 11/1966 | France . |
| 1559870 | 3/1969 | France . |
| 1119761 | 7/1968 | United Kingdom . |

OTHER PUBLICATIONS

Industrial Organic Pigments—Production, Properties and Applications, 1st Edition (1993), W. Herbstand K. Hunger, pp. 121, 129, 205–206, 242, VCH Pub., NY (No Month Available).

Patent Abstracts of Japan, vol. 14, No. 100 (C–0693) Publication No. JP1308461 "Production of AZO Pigment" Dec. 13, 1989.

Primary Examiner—Mark L. Bell
Assistant Examiner—Scott L. Hertzog
Attorney, Agent, or Firm—Kevin T. Mansfield

[57] ABSTRACT

The present invention provides an opaque resinated Pigment Yellow 12 containing from 10 to 40% by weight of a resin, based on the weight of pigment product.

10 Claims, No Drawings

PRODUCTION OF PIGMENTS

BACKGROUND OF THE INVENTION

The present invention relates to a process for the production of the diarylide pigment known as Pigment Yellow 12.

Diarylide pigments are used in oil ink applications and they are often resinated to provide beneficial properties such as good dispersibility, flow and strength.

The resination at high levels also results in pigments which have good transparency.

Opaque products are desirable for some printing applications such as for coldset inks used on newsprint. Generally, highly resinated diarylide pigments are too transparent when an opaque pigment is required.

BRIEF SUMMARY OF THE INVENTION

We have now surprisingly found that it is possible to prepare resinated Pigment Yellow 12 which is opaque, but which retains the other beneficial properties provided by resination such as good dispersion, strength, gloss and flow in the ink.

Pigment Yellow 12 is the diarylide pigment obtained by coupling acetoacetanilide with tetrazotised $3,3^1$-dichlorobenzidine.

Accordingly the present invention provides an opaque resinated Pigment Yellow 12 containing from 10 to 40% by weight of a resin, based on the weight of pigment product.

The present invention also provides a process for making an opaque resinated Pigment Yellow 12 by reacting acetoacetanilide with tetrazotised $3,3^1$-dichlorobenzidine wherein the reaction is carried out in the presence of a cationic or amine oxide surfactant.

Before the coupling reaction it is usual for the coupling component to be dissolved in an alkali and then precipitated in a finely divided form by addition of an acid such as acetic acid or a mixture of acetic and hydrochloric acids. The diarylide pigment is then formed by reaction of this coupling component with a solution of tetrazotised dichlorobenzidine.

The pigment may then be further treated by one or more methods well known in the art such as addition of a dyestuff, addition of amine, resin aeon and heat treatment.

It is known that properties of the final pigment product may be modified by incorporating a surfactant in the reaction mechanism during the coupling reaction. For example U.S. Pat No. 3,120,508 describes production of azo pigments having greater strength and improved stability by coupling in the presence of a surfactant. In another example U.S. Pat. No. 4,927,466 claims the formation of high strength, highly transparent azo pigments by coupling in the presence of certain cationic surfactants.

It is also well known to those skilled in the art that the properties of pigment products may be modified and improved by using rosin or other resins in the process. For example W. Herbst and K. Hunger in "Industrial Organic Pigments", VCH, Weinheim, 1993, page 206 report that addition of resins during the process result in transparent pigments with fine particle size.

DETAILED DESCRIPTION OF THE INVENTION

Surprisingly we have now found that carrying out the coupling reaction in the presence of a cationic or amine oxide surfactant followed by resination gives products which have increased opacity.

The surfactant maybe added to the coupling component before coupling. The coupling component may be precipitated from solution in the presence of the surfactant e.g. by the use of an acid containing the surfactant, or the surfactant may be added to the coupling component after precipitation but before coupling.

The surfactant maybe a quaternary compound or a primary, secondary or tertiary amine. The surfactant may also be a di, tri or polyamine, or an amine containing additional functional groups or an amine oxide.

Preferred surfactants are quaternary ammonium compounds or tertiary amines, or amine oxides.

The amount of surfactant may be from 1 to 40% by weight based on the weight of coupling component used, preferably 5–25% by weight.

In some cases, surfactant is present in the pigment product usually in amounts of 0.5 to 20% by weight of the pigment.

Examples of cationic surfactants are cocoamine oleylamine dicocoamine dimethyldodecylamine cocodimethylamine dimethyloctadecylamine dicocomethylamine hexadecyl trimethyl ammonium chloride coco trimethyl ammonium chloride hydrogenated tallow trimethyl ammonium chloride dicoco dimethyl ammonium chloride hydrogenated tallow benzyl dimethyl ammonium chloride N-tallow-1,3-diaminopropane Examples of amine oxide surfactants are cocodimethyl amine oxide tetradecyldimethyl amine oxide Temperature of the reaction during coupling may vary over a range of temperatures from 0°–50° C., typically 15°–350°.

The pigment is resinated by techniques after it has been produced using a natural or synthetic resin. Preferred resins are wood rosin or wood or tall oil resin which has been chemically modified by for example hydrogenation, disproportionation, polymerisation or by reaction with an organic reactant.

The proportion of resin to pigment may vary over a wide range depending on the pigment and may be from 10% to 40% by weight, based on the weight of pigment.

Together with the resin other additives may be added to the pigment. Examples of such additional additives include a second surfactant, long chain fatty acids and alcohols.

Surfactants used may be of the anionic type, such as fatty acid taurides, fatty acid N-methyltaurides, fatty acid isothionates, alkylbenzenesulphonates, alkylnaphthalenesulphonates, alkylphenol polyglycol ether sulphates and fatty alcohol polyglycol ether sulphates; fatty acids, such as palmitic, stearic and oleic acids; N-oxides of tertiary amines or salts thereof; non-ionic surfactants including fatty alcohol polyglycol ethers (ethoxylated fatty alcohols), fatty acid polyglycol ester, alkylphenol polyglycol ethers and dialkyl polyglycol ethers; polyamines, polyamides and ethoxylated amines. Alcohols may be long chain primary alcohols such as stearyl, oleyl or cetyl. Further examples of additives which may be added to the pigment are water soluble dyestuffs, which may be azo compounds substituted by one or more water solubilising groups such as —$CO_2H$ or —$SO_3H$.

The pigment may also be subjected to further treatments during the process of the invention. Treatments include heating at elevated temperatures, e.g. at 80° to 100° C. and addition of compounds of a multivalent element such as zirconium or aluminium.

The opaque resinated Pigment Yellow 12 of the invention is useful in the colouration of surface coatings especially printing inks, and in the colouration of plastics.

The invention is illustrated by the following Examples.

EXAMPLE 1

A solution of 650 parts of acetoacetanilide in 6000 parts of water containing 150 parts of sodium hydroxide is acidified by addition over 15 mins of a solution of 80 parts of acetic acid, 300 parts of concentrated hydrochloric acid and 60 parts of coco trimethyl ammonium chloride in 1000 parts of water. The resulting slurry is adjusted to a volume of 17000 parts at pH6 and a temperature 18° C. by addition of acid, ice and water. The acetoacetanilide slurry is then coupled over approximately one hour at pH 5.0 with a 10% solution of tetrazotised 3,3$^1$-dichlorobenzidine in dilute hydrochloric acid (made by tetrazotising 450 parts of 3,3$^1$-dichlorobenzidine in dilute hydrochloric acid with a slight excess of sodium nitrite) the pH being maintained by simultaneous addition of dilute sodium hydroxide solution.

A solution of 650 parts of the potassium salt of disproportionated tall oil resin in 2500 parts of water is then added to the pigment slurry before the temperature of the slurry is raised to 90° C. and the pH adjusted to 5.5 by addition of dilute hydrochloric acid. After holding at 90° C. for 20 min, a solution of 100 parts of zirconium basic carbonate paste in 60 parts of concentrated hydrochloric acid and 1000 parts of water is added. The slurry is held at 90° C. for 5 minutes, then flushed back to 70° C. and the pigment product filtered off, washed and dried.

EXAMPLE 2

A product is made essentially as described in Example 1 except that 80 parts of cocodimethyl amine are used in place of the cocotrimethyl ammonium chloride.

EXAMPLE 3

A product is made essentially as described in Example 2 except that the final addition of zirconium basic carbonate solution is omitted.

EXAMPLE 4

A product is made essentially as described in Example 1 except that 60 parts of tetradecyl dimethyl amine oxide are used in place of the coco trimethyl ammonium chloride.

EXAMPLE 5

Comparative Example: A product is made essentially as described in Example 1 except that no coco trimethyl ammonium chloride is used during precipitation of the coupling solution.

EXAMPLE 6

Comparative Example: A product is made essentially as described in Example 1 except that 60 parts of an ethoxylated long clain fatty alcohol are used in place of the coco trimethyl ammonium chloride.

EXAMPLE 7

Comparative Example: A product is made essentially as described in Example 1 except no coco trimethyl ammonium chloride is used during precipitation of this coupling solution and 120 parts of a mixture of cetyl and stearyl alcohols are dissolved in the resin solution before addition to the pigment slurry.

EXAMPLE 8

Inks are prepared from the products of Examples 1–7 at 11.5% pigmentation by triple roll milling into a typical cold set varnish.

Dispersion is assessed by microscopic examination of the ink.

Colouristic properties and print qualities are assessed visually from prints prepared at 1–1.2g/m film weight on newspaper.

Opacity is assessed visually by draw down of the ink on black paper.

Results are tabulated in Table 1, being quoted relative to the product of Example 7.

TABLE 1

| Product of | Dispersion | Strength | Gloss | Opacity |
| --- | --- | --- | --- | --- |
| Example 1 | + | = | + | 3-4 OP |
| Example 2 | = | = | = | 4 OP |
| Example 3 | = | = | = | 3 OP |
| Example 4 | ++ | = | ++ | 2 OP |
| Example 5 | + | = | = | 3 TR |
| Example 6 | – | – | ++ | 3 TR |
| Example 7 (Standard) | STD | STD | STD | STD |

EXAMPLE 9

A solution of 650 parts of acetoacetanilide in 6000 parts of water containing 150 parts of sodium hydroxide and 80 parts of cocotrimethyl ammonium chloride, is acidified by the addition over 15 minutes of a solution of 80 parts of acetic acid, 300 parts of concentrated hydrochloric acid in 1000 parts of water.

The resulting slurry is adjusted to a volume of 17000 parts at pH 6.0 and a temperature of 26° C. by the addition of acid to water. The acetoacetanilide slurry is then coupled over approximately 1 hour at pH 5.0 with a 10% solution of tetrazotised 3,3$^1$-dichlorobenzidine in dilute hydrochloric acid (made by tetrazotising 450 parts of 3,3$^1$ dichlorobenzidine in dilute hydrochloric acid with a slight excess of sodium nitrite). The pH is maintained by simultaneous addition of dilute sodium hydroxide solution.

A solution of 650 parts of the potassium salt of disproportionated tall oil resin in 2500 parts of water is then added to the coupled slurry before the temperature of the slurry is raised to 90° C. and pH adjusted to 5.5 by the addition of dilute hydrochloric acid. After holding at 90° C. for 20 minutes, slurry is flushed back to 70° C. and the pigment product filtered off, washed and dried.

The product is tested as described in Example 8 and found to have opacity the same as the product of Example 2.

EXAMPLE 10

The process is carried out essentially as described in Example 9 except that the quaternary amine surfactant is added to the coupling component after precipitation by addition of the acid, instead of to the coupling component solution.

The product is tested as described in Example 8 and found to have opacity the same as the product of Example 2.

We claim:

1. An opaque resinated Pigment Yellow 12 containing from 10 to 40% by weight of a resin, based on the weight of pigment product.

2. An opaque resinated Pigment Yellow 12 as claimed in claim 1 which also contains 0.5 to 20% by weight of a cationic or amine oxide surfactant.

3. A process for making an opaque resinated Pigment Yellow 12 by reacting acetoacetanilide with tetrazotised 3,3¹-dichlorobenzidine wherein the reaction is carried out in the presence of a cationic or amine oxide surfactant, and the resulting pigment slurry is resinated.

4. A process as claimed in claim 3 in which the coupling component is precipitated from solution in the presence of the surfactant.

5. A process as claimed in claim 4 in which the coupling component is precipitated from solution by adding an acid containing the surfactant.

6. A process as claimed in claim 3 in which the surfactant is added to the coupling component after precipitation but before coupling.

7. A process as claimed in claim 3 in which a cationic surfactant which is a tertiary amine or a quaternary ammonium compound is employed.

8. A process as claimed in claim 7 in which the cationic surfactant is selected from the group consisting of dodecyl dimethyl amine cocodimethyl amine hexadecyl trimethyl ammonium chloride and hydrogenated tallow trimethyl ammonium chloride.

9. A process as claimed in claim 3 which the amount of surfactant is from 5–25% by weight based on the weight of the coupling component.

10. A process for the colouration of surface coatings which comprises incorporating therein an opaque resinated Pigment Yellow 12 as claimed in claim 1.

* * * * *